US012148374B2

(12) United States Patent
Wei et al.

(10) Patent No.: US 12,148,374 B2
(45) Date of Patent: Nov. 19, 2024

(54) CONTROL DEVICE AND DRIVING METHOD THEREFOR, AND DISPLAY DEVICE

(71) Applicants: Hefei BOE Joint Technology Co.,Ltd., Anhui (CN); BOE Technology Group Co., Ltd., Beijing (CN)

(72) Inventors: Xiaolong Wei, Beijing (CN); Song Meng, Beijing (CN); Jingbo Xu, Beijing (CN); Pan Li, Beijing (CN); Wenchao Bao, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/779,141

(22) PCT Filed: Jul. 21, 2021

(86) PCT No.: PCT/CN2021/107672
§ 371 (c)(1),
(2) Date: May 24, 2022

(87) PCT Pub. No.: WO2023/000216
PCT Pub. Date: Jan. 26, 2023

(65) Prior Publication Data
US 2024/0169907 A1 May 23, 2024

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0842* (2013.01);
(Continued)

(58) Field of Classification Search
CPC ............... G09G 3/3233; G09G 3/2096; G09G 2320/0233; G09G 2320/0257; G09G 2320/043
See application file for complete search history.

(56) References Cited

U.S. PATENT DOCUMENTS

2012/0162159 A1* 6/2012 Kim .................... G09G 3/3233 345/82
2014/0307117 A1* 10/2014 Feng ................... H04N 23/741 348/218.1
(Continued)

FOREIGN PATENT DOCUMENTS

CN 106057861 A 10/2016
CN 106157919 A 11/2016
(Continued)

OTHER PUBLICATIONS

European Search Report for 21950474.3 Mailed Apr. 8, 2024.

*Primary Examiner* — Matthew A Eason
*Assistant Examiner* — Sujit Shah
(74) *Attorney, Agent, or Firm* — Ling Wu; Stephen Yang; Ling and Yang Intellectual Property

(57) ABSTRACT

A control device includes a memory and a processor. The memory is configured to store a time comparison table. The processor is configured to determine whether a displayed image is a still image. When the displayed image is determined to be a still image, the time comparison table is queried for a corresponding still image judgment duration according to an average pixel level and a type of the still image.

18 Claims, 6 Drawing Sheets

(52) U.S. Cl.
CPC ............... *G09G 2320/0233* (2013.01); *G09G 2320/0257* (2013.01); *G09G 2320/043* (2013.01)

(56) References Cited

U.S. PATENT DOCUMENTS

| | | | | |
|---|---|---|---|---|
| 2017/0186357 | A1 | 6/2017 | Zeng et al. | |
| 2019/0066603 | A1* | 2/2019 | Lee | G09G 3/3233 |
| 2021/0400229 | A1* | 12/2021 | Chen | H04N 5/57 |

FOREIGN PATENT DOCUMENTS

| | | | |
|---|---|---|---|
| CN | 108847201 | A | 11/2018 |
| CN | 109754752 | A | 5/2019 |
| EP | 1067782 | A2 | 1/2001 |
| EP | 3869492 | A1 | 8/2021 |

* cited by examiner

CONTROL DEVICE AND DRIVING METHOD THEREFOR, AND DISPLAY DEVICE

CROSS-REFERENCE TO RELATED APPLICATION

The present disclosure is a U.S. National Phase Entry of International Application PCT/CN2021/107672 having an international filing date of Jul. 21, 2021, and the contents disclosed in the above-mentioned application are hereby incorporated as a part of this application.

TECHNICAL FIELD

The present disclosure relates to the field of display technology, in particular to a control device, a driving method for driving the control device, and a display device.

BACKGROUND

OLED (Organic Light Emitting Display) display device is considered as a new application technology of the next generation flat panel display due to its excellent characteristics such as self-luminescence, high contrast, small thickness, wide viewing angle, fast response speed, applicability for flexible panel, wide range of operating temperature, simple structure and manufacture procedure, etc.

SUMMARY

The following is a summary of subject matters described herein in detail. The summary is not intended to limit the protection scope of claims.

Embodiments of the present disclosure provide a control device, a method for driving the control device, and a display device.

In one aspect, an embodiment of the present disclosure provides a control device including a memory and a processor. The memory is configured to store a time comparison table. The processor is configured to determine whether a displayed image is a still image and query the time comparison table for a corresponding still image judgment duration according to an average pixel level and a type of the still image when the displayed image is determined as the still image.

In some exemplary implementations, the processor is further configured to determine whether the still image remains still within the still image judgment duration, and perform brightness attenuation on the still image until the still image no longer remains still when it is determined that duration for which the still image remains still has reached the still image judgment duration.

In some exemplary implementations, the still image is one of the following types: full-screen image, monochrome window image, mixed-color window image.

In some exemplary implementations, the time comparison table stores a mapping relationship between an average pixel level and a still image judgment duration of a full-screen still image, and a mapping relationship between an average pixel level and a still image judgment duration of a window still image.

In some exemplary implementations, the mapping relationship between the average pixel level and the still image judgment duration of the full-screen still image includes: when the average pixel level of the full-screen still image is less than or equal to a first threshold value, the still image judgment duration is a first value; when the average pixel level of the full-screen still image is greater than the first threshold value, the still image judgment duration is smaller than the first value and greater than or equal to a second value, wherein the still image judgment duration decreases as the average pixel level of the full-screen still image increases.

In some exemplary implementations, the first threshold value has a range of 0.4 to 0.6.

In some exemplary implementations, the mapping relationship between the average pixel level and the still image judgment duration of the window still image includes: when the window still image is a monochrome window displayed image, and the average pixel level of the window still image is less than or equal to the second threshold value, the still image judgment duration is a third value; when the window still image is a monochrome window displayed image, and the average pixel level of the window still image is greater than the second threshold value and less than or equal to a third threshold value, the still image judgment duration is greater than the third value and less than or equal to a fourth value, and the still image judgment duration increases as the average pixel level of the window still image increases; when the window still image is a mixed-color window displayed image, and the average pixel level of the window still image is greater than the third threshold value, the still image judgment duration is greater than the third value and less than or equal to the fourth value, and the still image judgment duration decreases as the average pixel level of the window still image increases.

In some exemplary implementations, the second threshold value has a range of less than or equal to 0.05 and the third threshold value has a range of 0.4 to 0.6.

In some exemplary implementations, the mapping relationship between the average pixel level and the still image judgment duration of the window still image includes: when the window still image is a monochrome window displayed image and the average pixel level of the window still image is less than or equal to a fourth threshold value, the still image judgment duration is a fifth value; when the window still image is a monochrome window displayed image, and the average pixel level of the window still image is larger than the fourth threshold value and less than or equal to the fifth threshold value, the still image judgment duration is greater than the fifth value and less than or equal to a sixth value, and the still image judgment duration increases as the average pixel level of the window still image increases; when the window still image is a mixed-color window displayed image, the still image judgment duration is a seventh value, wherein the seventh value is less than the sixth value.

In some exemplary implementations, the fourth threshold value has a range of less than or equal to 0.05 and the fifth threshold value has a range of 0.4 to 0.6.

In some exemplary implementations, the time comparison table stores the following mapping relationships:

- when the average pixel level of the full-screen still image is in [0, 0.5], $y=60$;
- when the average pixel level of the full-screen still image is in (0.5, 1], $y=-100x+110$;
- when the average pixel level of a monochrome window still image is in [0, 0.05], $y=10$;
- when the average pixel level of the monochrome window still image is in (0.05, 0.5], $y=111x+4.44$; and
- when the average pixel level of the mixed-color window still image is in (0.5, 1], $y=-100x+110$;

where x represents the average pixel level of the still image, and y represents the still image judgment duration.

In some exemplary implementations, the time comparison table stores the following mapping relationships:

when the average pixel level of the full-screen still image is in [0, 0.5], y=60;

when the average pixel level of the full-screen still image is in (0.5, 1], y=−100x+110;

when an average pixel level of a monochrome window still image is in [0, 0.05], y=10;

when the average pixel level of the monochrome window still image is in (0.05, 0.5], y=111x+4.44; and when an average pixel level of a mixed-color window still image is in [0, 1], y=10;

where x represents the average pixel level of the still image, and y represents the still image judgment duration.

In another aspect, an embodiment of the present disclosure provides a method driving for a control device, including: determining whether a displayed image is a still image; and querying a stored time comparison table for a corresponding still image judgment duration according to an average pixel level and a type of the still image when the displayed image is determined as the still image.

In some exemplary implementations, the method described above further includes: determining whether the still image remains still within the still image judgment duration; and performing brightness attenuation on the still image until the still image no longer remains still when it is determined that duration for which the still image remains still has reached the still image judgment duration.

In another aspect, an embodiment of the present disclosure provides a display device, which includes the aforementioned control device.

In some exemplary implementations, the control device is integrated in a timing controller; or, a processor of the control device is integrated in the timing controller, and a memory of the control device is disposed independently of the timing controller.

In some exemplary implementations, the display device may further include: a data driver. The data driver is configured to generate a data signal to be provided to a data signal line by using a gray scale value and a control signal which are received from the timing controller.

In some exemplary implementations, the display device may further include: a gate driver. The gate driver is configured to generate a scanning signal to be provided to a scanning signal line and a sensing control signal provided to a sensing control line by using a clock signal and a starting signal which are received from the timing controller.

In some exemplary implementations, the display device may further include: a pixel array; the pixel array includes multiple sub-pixels, and at least one of the sub-pixels includes a pixel circuit and a light emitting element. The pixel circuit includes an input transistor, a driving transistor, a sensing transistor and a storage capacitor. A control electrode of the input transistor is electrically connected with a scanning signal line, a first electrode of the input transistor is electrically connected with a data signal line, and a second electrode of the input transistor is electrically connected with a control electrode of the driving transistor. A first electrode of the driving transistor is electrically connected with a first power supply line, and a second electrode of the driving transistor is electrically connected with a first electrode of the light emitting element. A control electrode of the sensing transistor is electrically connected with a sensing control line, a first electrode of the sensing transistor is electrically connected with the second electrode of the driving transistor, and a second electrode of the sensing transistor is electrically connected with a sensing signal line. A first electrode of the storage capacitor is electrically connected with the control electrode of the driving transistor, and a second electrode of the storage capacitor is electrically connected with the second electrode of the driving transistor. A second electrode of the light emitting element is connected with a second power supply line.

In another aspect, an embodiment of the present disclosure provides a non-transitory computer readable storage medium storing a computer program. The method described above is implemented when the computer program is executed.

Other aspects may be understood upon reading and understanding of the accompanying drawings and detailed descriptions.

BRIEF DESCRIPTION OF DRAWINGS

Accompanying drawings are used for providing further understanding of technical solutions of the present disclosure, constitute a part of the specification, and are used for explaining the technical solutions of the present disclosure together with the embodiments of the present disclosure, but do not constitute limitations on the technical solutions of the present disclosure. Shapes and sizes of one or more components in the accompanying drawings do not reflect actual scales and are only intended to illustrate the contents of the present disclosure.

DETAILED DESCRIPTION

Figure 1:
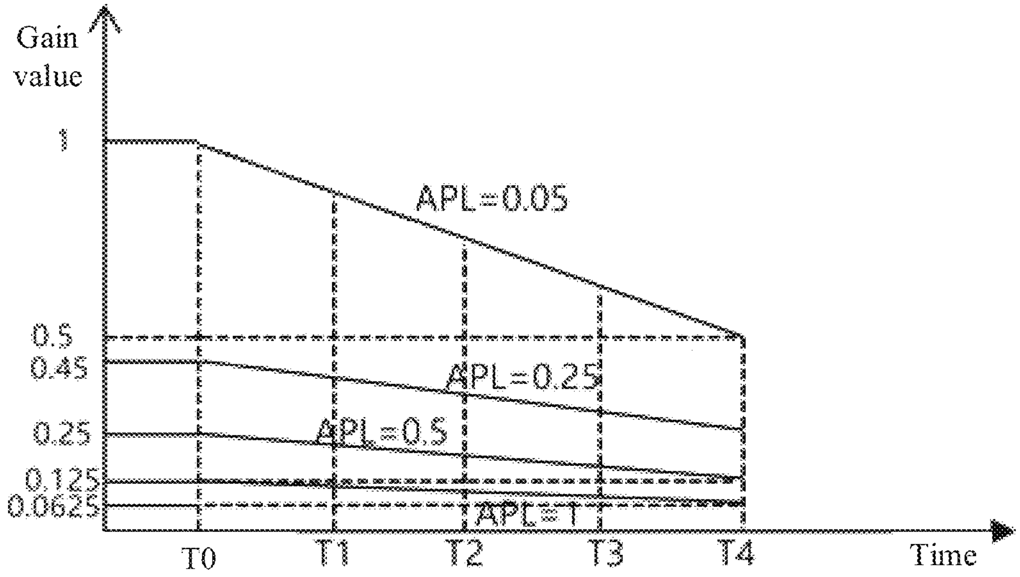
FIG. 1 is a brightness attenuation graph of a still image.
Figure 2:
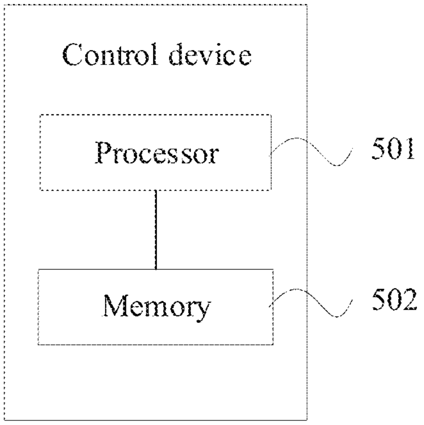
FIG. 2 is a schematic diagram of a control device according to at least one embodiment of the present disclosure.

Embodiments of the present disclosure will be described in detail below with reference to the accompanying drawings. Implementations may be implemented in multiple different forms. Those of ordinary skills in the art may easily understand such a fact that implementations and contents may be transformed into other forms without departing from the purpose and scope of the present disclosure. Therefore, the present disclosure should not be explained as being limited to contents described in following implementations only. The embodiments in the present disclosure and features in the embodiments may be combined randomly with each other if there is no conflict.

In the accompanying drawings, a size of one or more constituent elements, and a thickness or an area of a layer is sometimes exaggerated for clarity. Therefore, one implementation of the present disclosure is not necessarily limited to the dimension, and shapes and sizes of one or multiple components in the accompanying drawings do not reflect actual scales. In addition, the drawings schematically illustrate ideal examples, and one implementation of the present disclosure is not limited to the shapes, numerical values, or the like shown in the drawings.

Ordinal numerals such as “first”, “second”, and “third” in the specification are set to avoid confusion between constituent elements, but are not intended to limit in terms of quantity. “Multiple/multiple” in the present disclosure means a quantity of two or more.

In the specification, for convenience, wordings indicating directional or positional relationships, such as “center”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred device or element must have a particular orientation and be constructed and operated in the particular orientation. Therefore, they cannot be understood as limitations on the present disclosure. The positional relationships between the constituent elements may be changed as appropriate according to the direction according to which the constituent elements are described. Therefore, appropriate replacements may be made according to situations without being limited to the wordings described in the specification.

In the specification, unless otherwise specified and defined explicitly, terms “mount”, “mutually connect”, and “connect” should be understood in a broad sense. For example, a connection may be a fixed connection, a detachable connection, or an integrated connection, it may be a mechanical connection or a connection, and it may be a direct connection, an indirect connection through intermediate components, or internal communication between two components. Those of ordinary skills in the art may understand meanings of the above-mentioned terms in the present disclosure according to situations.

In the specification, “electrical connection” includes a case that constituent elements are connected together through an element with a certain electrical effect. There is no specific restriction on “the element with certain electrical effect” as long as they may transmit electrical signals between the connected constituent elements. Examples of “the element with the certain electric action” not only include electrodes and wirings, but also include switch elements such as transistors, resistors, inductors, capacitors, other elements with various functions, etc.

In the specification, “parallel” refers to a state in which an angle formed by two straight lines is above −10° and below 10°, and thus also includes a state in which the angle is above −5° and below 5°. In addition, “perpendicular” refers to a state in which an angle formed by two straight lines is above 80° and below 100°, and thus also includes a state in which the angle is above 85° and below 95°.

In the present disclosure, “about” and “approximately” refers to that a boundary is defined not so strictly and numerical values within process and measurement error ranges are allowed.

With the development of display technology, users gradually have higher requirements on intelligent functions of displays. For example, lighting a still image in a state with high brightness for a long time will easily cause TFT (Thin Film Transistor) to age and produce afterimage, thus affecting display effects of a display. In order to avoid the short-term afterimage of the panel caused by the long-term fixed pressure of the high-brightness still image on a driving transistor of OLED, the brightness of the displayed still image will be attenuated. In some examples, it is judged whether an image displayed in the current frame is consistent with an image displayed in the previous frame according to characteristic values of the frames displayed (e.g. brightness sum, gray scale sum, etc.), wherein if the characteristic values of the images displayed in the two frames are consistent, the displayed image in the current frame is judged as a still image. When the still image remains still all the time (that is, the characteristic values remain consistent) in the still image judgment duration, the brightness attenuation is started for the still image. If the characteristic values are inconsistent in the still image judgment duration, the judgment of still state of the displayed image is restarted.

FIG. 1 is a brightness attenuation graph of a still image. As shown in FIG. 1, for still images with different average pixel levels (APL), their still image judgment durations and brightness attenuation durations are consistent. For example, an APL may be an average value of a brightness sum of all pixels of a displayed image, or a ratio of the brightness sum of all the pixels of the displayed image to a maximum brightness of the pixels. The APL can reflect a brightness degree of the displayed image. Display brightness gain (Gain) values under different APLs can be parameter values obtained by using a High Dynamic Range (HDR) algorithm. For example, APL=0.05 corresponds to a 10% window and a monochrome image with 255 gray scales, the highest display brightness for white is 800 nit, and a gain value used is 1. When APL=0.25 corresponds to a 50% window and a monochrome image with 255 gray scales (for example, 255 gray scale red, 255 gray scale green, 255 gray scale blue, or 255 gray scale white), the display brightness for white is 360 nit, and a gain value used is 0.45. APL=0.5 corresponds to a full-screen and a monochrome image with 255 gray scales (for example, 255 gray scale red, 255 gray scale green, 255 gray scale blue, or 255 gray scale white), the display brightness for white is 200 nit and a gain value used is 0.25. APL=1 corresponds to a full-screen and a mixed-color image with 255 gray scales (for example, 255 gray scale red-green image, 255 gray scale green-blue image, 255 gray scale red-blue image).

As shown in FIG. 1, still images with APL=0.05, APL=0.5, APL=0.25 and APL=1 all start brightness attenuation at time point T0, and complete uniform brightness attenuation at time point T4, for example, the brightness attenuation amplitude is 50% of the original brightness. A still image judgment duration is duration from an original point to time point T0, and a brightness attenuation duration is duration from time point T0 to time point T4.

As can be seen from FIG. 1, no matter how bright or dark the still image is, the brightness attenuation starts at the same time point (i.e. time point T0). For a high-brightness still image, a short-term afterimage may still be caused, and the power consumption saved is limited.

The embodiments of the disclosure provides a control device, a method for driving the control device and a display device, which flexibly adjusts still image judgment durations according to different still images, so as to effectively solve the case of short-term afterimage caused by the high-brightness still image, and may reduce power consumption, thereby improving display effects of a display product.

FIG. 1 is a schematic diagram of a control device according to at least one embodiment of the present disclosure. As shown in FIG. 1, the control device provided in the embodiment of the present disclosure includes a memory 502 and a processor 501. The memory 502 is configured to store a time comparison table. The processor 501 is configured to determine whether a displayed image is a still image. When the displayed image is determined as a still image, the time comparison table is queried for corresponding still image judgment duration according to an average pixel level and a type of the still image.

In some exemplary implementations, the processor is further configured to determine whether the still image remains still within the still image judgment duration, wherein when duration for which the still image remains still is determined to reach the still image judgment duration, brightness attenuation is performed on the still image until the still image no longer remains still.

In some exemplary implementations, the processor may determine whether the displayed image is a still image according to a still image judgment condition. For example, the still image judging condition may include determining an image displayed in a current frame as a still image if characteristic values of the image displayed in the current frame are consistent with those of an image displayed in the previous frame. In some examples, the memory may sequentially store image data of multiple frames of displayed images, and the processor may determine whether a still image exists by comparing whether the characteristic values of the image data of multiple successive frames are consistent. In some examples, the characteristic values may include gray scale sum. However, this embodiment is not limited thereto.

In some exemplary implementations, the type of the still image may be one of the following: full-screen image, monochrome window image, mixed-color window image. In some examples, the type of still image may be determined according to the number and the color of effective display sub-pixels within the displayed image. Herein, an effective display sub-pixel may be a sub-pixel with a non-zero display gray scale. For example, a display area of the still image may be determined according to the number of effective display sub-pixels within the display region, thereby determining whether the still image is a full-screen displayed image. Herein, the display area of the full-screen displayed image accounts for about 100% of the display region, and a display area of a window displayed image can account for less than 100% of the display region. According to the color(s) of the effective display sub-pixels of the still image, it can be determined whether the still image is a monochrome image.

In some exemplary implementations, the value of APL may range from 0 to 1, i.e. greater than or equal to 0 and less than or equal to 1. In some examples, APL of a still image may be calculated in the following manner: accumulating brightness of all sub-pixels of a display region (including, for example, red sub-pixels, green sub-pixels, blue sub-pixels, and white sub-pixels) to obtain a total brightness sum, calculating a ratio of the total brightness sum to a constant to obtain an APL, and the calculated APL is between 0 and 1. For example, the above constant may be an area of the display region. However, this embodiment is not limited thereto.

In some exemplary implementations, after the processor determines that the displayed image is a still image, the APL of the still image can be determined, and multiple still image judgment durations corresponding to the APL of multiple still images can be obtained by querying a time comparison table pre-stored in the memory. Then, according to the type of the still image, a still image judgment duration matching the type of the still image is selected from the found multiple still image judgment durations. Alternatively, in some examples, after the displayed image is determined to be a still image, the processor can find a mapping relationship between the APL and the still image judgment duration satisfying the type of the still image by querying the time comparison table in the memory according to the type of the still image, and then determine a corresponding still image judgment duration according to the APL of the still image and the mapping relationship. However, this embodiment is not limited thereto.

In some exemplary implementations, after determining the still image still image judgment duration of the still image by querying the time comparison table, brightness attenuation processing can be performed on the still image after duration for which the still image remains still reaches the still image judgment duration, and stop the brightness attenuation processing when it is detected that the still image no longer remains still. When the duration for which the still image remains still does not reach the still image judgment duration, the still image is not subjected to brightness attenuation processing, and whether the displayed image of the current frame is kept still is continuously judged. After a still image is determined, the time comparison table is queried again to determine the still image judgment duration corresponding to the new still image. In this example, the still image remaining still means that the still image satisfies the still image judgment condition, and the still image not remaining still means that the still image does not satisfy the still image judgment condition. In some examples, the brightness attenuation processing on the still image may include attenuating brightness of each effective pixel of the still image, for example, multiplying the brightness of each effective pixel by a proportionality coefficient less than 1 to achieve brightness attenuation for each effective pixel. However, this embodiment is not limited thereto.

The control device provided in this embodiment flexibly adjust a still image judgment duration of a still image based on a type and an APL of the still image, which is conducive to shortening overall time of brightness attenuation of the still image, thus effectively avoiding the case of short-term afterimage caused by a high-brightness still image, reducing power consumption and improving display effects of a display product.

In some exemplary implementations, the time comparison table in the memory stores a mapping relationship between an average pixel level and a still image judgment duration of a full-screen still image, and a mapping relationship between an average pixel level and a still image judgment duration of a window still image.

In some exemplary implementations, the mapping relationship between the average pixel level and the still image judgment duration of the full-screen still image includes: when the average pixel level of the full-screen still image is less than or equal to a first threshold value, the still image judgment duration is a first value; when the average pixel level of the full-screen still image is greater than the first threshold value, the still image judgment duration is smaller than the first value and greater than or equal to a second value, wherein the still image judgment duration decreases as the average pixel level of the full-screen still image increases.

In some exemplary implementations, when the APL of the full-screen still image is greater than the first threshold value, there may be a linear relationship between the APL of the full-screen still image and the still image judgment duration. For example, the mapping relationship between the APL and still image judgment duration of the full-screen still image can satisfy a straight line equation or curve equation. However, this embodiment is not limited thereto.

In some exemplary implementations, the first threshold value may range from 0.4 to 0.6 (i.e. greater than or equal to 0.4 and less than or equal to 0.6). For example, the first threshold value may be about 0.5. In some examples, the first value may be about 60 and the second value may be about 10. For example, when an APL of a full-screen still image is less than or equal to 0.5, the still image judgment duration of the full-screen still image can be about 60 s. When the APL of the full-screen still image is greater than 0.5, the still image judgment duration of the full-screen still image can be in a range of less than 60 s and greater than or equal to 10 s, and decreases as the APL increases. However, this embodiment is not limited thereto. For example, the first value and the second value may be other values, and the first value is greater than the second value.

In some exemplary implementations, the mapping relationship between the APL and the still image judgment duration of the window still image includes: when the window still image is a monochrome window displayed image, and the average pixel level of the window still image is less than or equal to a second threshold value, the still image judgment duration is a third value; when the window still image is a monochrome window displayed image, and the average pixel level of the window still image is greater than the second threshold value and less than or equal to a third threshold value, the still image judgment duration is greater than the third value and less than or equal to the fourth value, and the still image judgment duration increases as the average pixel level of the window still image increases; when the window displayed image is a mixed-color window displayed image, and the average pixel level of the window still image is greater than the third threshold value, the still image judgment duration is greater than the third value and less than or equal to the fourth value, and the still image judgment duration decreases as the average pixel level of the window still image increases.

In some exemplary implementations, there is a linear relationship between the APL and the still image judgment duration of the window still image. For example, when the APL of the window still image is greater than the second threshold value and less than or equal to the third threshold value, the mapping relationship between the APL and the still image judgment duration of the window still image can satisfy a straight line equation or a curve equation. When the APL of the window still image is greater than the third threshold value, the mapping relationship between the APL and the still image judgment duration of the window still image can satisfy another straight line equation or another curve equation. However, this embodiment is not limited thereto.

In some exemplary implementations, the second threshold value has a range of less than or equal to 0.05 and the third threshold value has a range of 0.4 to 0.6 (i.e. greater than or equal to 0.4 and less than or equal to 0.6). For example, the second threshold value may be about 0.05 and the third threshold value may be about 0.5. In some examples, the third value may be substantially the same as the second value, for example, both about 10. The fourth value may be substantially the same as the first value, for example, both about 60. For example, when the APL of the window still image is less than or equal to 0.05, the still image judgment duration of the window still image can be about 10 s. When the APL of the window still image is greater than 0.05 and less than or equal to 0.5, the still image judgment duration of the window still image is in a range of 10 s to 60 s, and increases as the APL increases. When the APL of the window still image is greater than 0.5, the APL of the window still image is in a range of 10 s to 60 s, and decreases as the APL increases. However, this embodiment is not limited thereto. For example, the third value and fourth value may be other values, and the fourth value is greater than the third value.

In some exemplary implementations, the mapping relationship between the average pixel level and the still image judgment duration of the window still image includes: when the window still image is a monochrome window displayed image and the average pixel level of the window still image is less than or equal to a fourth threshold value, the still image judgment duration is a fifth value. When the window still image is a monochrome window displayed image, and the average pixel level of the window still image is larger than the fourth threshold value and less than or equal to the fifth threshold value, the still image judgment duration is greater than the fifth value and less than or equal to a sixth value, and the still image judgment duration increases as the average pixel level of the window still image increases. When the window still image is a mixed-color window displayed image, the still image judgment duration is a seventh value, wherein the seventh value is less than the sixth value.

In some exemplary implementations, there may be a linear relationship between the APL and the still image judgment duration of the window still image. For example, the mapping relationship between the APL and the still image judgment duration of the monochrome window still image can satisfy a straight line equation or a curve equation when the APL is in a range of greater than the fourth threshold value and less than or equal to the fifth threshold value. However, this embodiment is not limited thereto.

In some exemplary implementations, a range of the fourth threshold value may be less than or equal to 0.05 and a range of the fifth threshold value may be from 0.4 to 0.6 (i.e. greater than or equal to 0.4 and less than or equal to 0.6). For example, the fourth threshold value may be about 0.05 and the fifth threshold value may be about 0.5. In some examples, the fifth value and the seventh value may be the same, for example both may be about 10, and the sixth value may be about 60. For example, when an APL of a monochrome window displayed image is less than or equal to 0.05, the still image judgment duration can be about 10 s. When the APL of the monochrome window displayed image is greater than 0.05 and less than or equal to 0.5, the still image judgment duration can be in a range of 10 s to 60 s, and increases as the APL increases. Still image judgment duration of a mixed-color window displayed image can be about 10 s. However, this embodiment is not limited thereto. For example, the fifth value, the sixth value, and the seventh value may be other values, wherein the fifth value and the seventh value may be different, the sixth value is greater than the fifth value, and the sixth value is greater than the seventh value.

Solutions of the embodiments will be described below through multiple examples.

Figure 3:
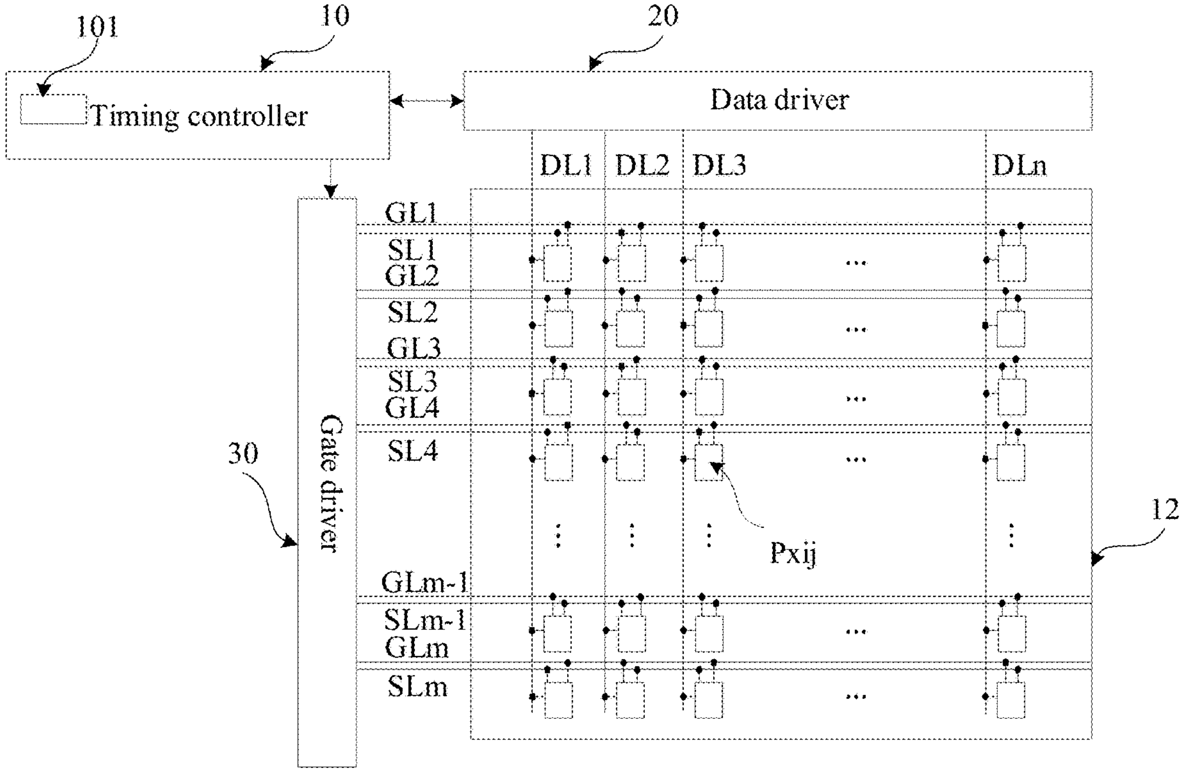
FIG. 3 is a schematic diagram of a display device according to at least one embodiment of the present disclosure.

FIG. 3 is a schematic diagram of a display device according to at least one embodiment of the present disclosure. As shown in FIG. 3, the display device of this exemplary embodiment includes: a pixel array 12 and a panel driver. The panel driver is configured to drive the pixel array 12. The panel driver may include a timing controller 10, a data driver 20 and a gate driver 30. The control device 101 provided in this embodiment may be integrated in the timing controller 10.

In some exemplary implementations, the pixel array 12 may include: multiple scanning signal lines (for example, GL1 to GLm), multiple data signal lines (for example, DL1 to DLn), multiple sensing control lines (for example, SL1 to SLm), and multiple sensing signal lines (not shown in the figures), and multiple sub-pixels PXij. Herein, both m and n are positive integers.

In some exemplary implementations, the multiple scanning signal lines GL1 to GLm and the multiple sensing control signals SL1 to SLm are formed in a first direction (for example, a horizontal direction) of the display panel, and the multiple data signal lines DL1 to DLn and the multiple sensing signal lines may be formed in a second direction (for example, a vertical direction) of the display panel. Herein, the first direction intersects with the second direction, for example, the first direction is perpendicular to the second direction. Multiple data signal lines and multiple sensing signal lines are configured to intersect multiple scanning signal lines and multiple sensing control lines.

In some exemplary implementations, the timing controller 10 may provide the data driver 20 with a gray scale value and a control signal which are suitable for the specification of the data driver. The data driver 20 may generate a data signal to be provided to the data signal lines DL1 to DLn by using the gray scale value and the control signal received from the timing controller 10. For example, the data driver 20 may sample the gray scale value by using a clock signal, and apply a data signal corresponding to the gray scale value to the data signal lines DL1 to DLn by taking a sub-pixel row as a unit. In some examples, after the control device 101 determines that brightness attenuation is required to be performed on a still image, the timing controller 10 may provide updated gray scale value and control signal to the data driver 20 so that the data driver 20 generates the data signal to be provided to the data signal lines, so as to improve the display brightness of the displayed image.

In some exemplary implementations, the timing controller 10 may provide the gate driver 30 with a clock signal, a scanning starting signal, a sensing starting signal, etc., which are suitable for the specification of the gate driver 30. The gate driver 30 may generate a scanning signal to be provided to the scanning signal lines GL1 to GLm and a sensing control signal to be provided to the sensing control lines SL1 to SLm by using the clock signal, the scanning starting signal, the sensing starting signal, etc., which are received from the timing controller 10. For example, the gate driver 30 may include: a scanning driving circuit and a sensing driving circuit. The scanning drive circuit may sequentially provide a scanning signal with an on-level pulse for the scanning signal lines GL1 to GLm. The sensing drive circuit may sequentially provide a sensing control signal with an on-level pulse for the sensing control lines SL1 to SLm. For example, the scanning driving circuit may be constructed in a form of a shift register and may generate a scanning signal by sequentially transmitting the scanning starting signal provided in a form of the on-level pulse to a next-stage circuit under the control of the scanning clock signal. The sensing driving circuit may be constructed in a form of a shift register and may generate a sensing control signal by sequentially transmitting the sensing control signal provided in a form of the on-level pulse to a next-stage circuit under the control of the sensing clock signal.

In some exemplary implementations, the data driver 20 may acquire sensing data through the sensing signal lines, and transmit the sensing data to the timing controller 10. The timing controller 10 may determine compensation data of electrical characteristic parameters of a driving transistor according to the sensing data, and store the compensation data.

In some exemplary implementations, the scanning driving circuit and the sensing driving circuit included in the gate driver 30 may be located on opposite sides of the pixel array 12 (for example, a left side and a right side of the pixel array). However, this embodiment is not limited thereto. For example, gate drivers are disposed on both opposite sides of the pixel array, so as to achieve bilateral driving of the sub-pixels.

In some exemplary implementations, the gate driver 30 may be formed by an integrated circuit, or may be directly formed on a base substrate of a display panel during a process of preparing the pixel circuits of the sub-pixels. However, this embodiment is not limited thereto.

In some exemplary implementations, each sub-pixel PXij within the pixel array 12 may be electrically connected with corresponding data signal line, scanning signal line, sensing control line, and sensing signal line, wherein i and j may be natural numbers. The sub-pixel PXij may refer to a sub-pixel in which a transistor is electrically connected with an i-th scanning signal line and is electrically connected with a j-th data signal line.

Figure 4:
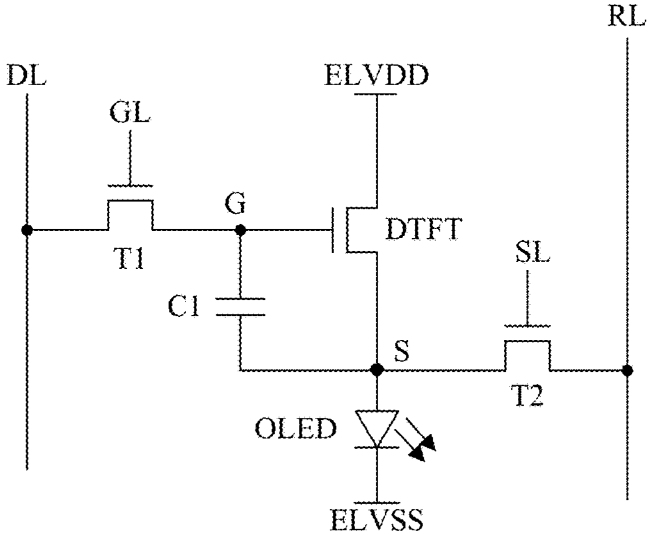
FIG. 4 is a schematic diagram of a pixel circuit according to at least one embodiment of the present disclosure.

In some exemplary implementations, the sub-pixel includes a pixel circuit and a light emitting element. FIG. 4 is a schematic diagram of a pixel circuit according to at least one embodiment of the present disclosure. The pixel circuit shown in FIG. 4 has a 3T1C structure. This embodiment has no restriction on the pixel circuit. For example, the pixel circuit may have a 4T1C, 5T1C, 5T2C, 6T1C, or 7T1C structure.

In some exemplary implementations, as shown in FIG. 4, the pixel circuit may include an input transistor T1, a driving transistor DTFT, a sensing transistor T2 and a storage capacitor C1. A control electrode of the input transistor T1 is electrically connected with a scanning signal line GL, a first electrode of the input transistor T1 is electrically connected with a data signal line DL, and a second electrode of the input transistor T1 is electrically connected with a control electrode of the driving transistor DTFT. A first electrode of the driving transistor DTFT is electrically connected with a first power supply line ELVDD, and a second electrode of the driving transistor DTFT is electrically connected with a first electrode of the light emitting element OLED. A second electrode of the light emitting element OLED is electrically connected with a second power supply line ELVSS. A first electrode of the storage capacitor C1 is electrically connected with a control electrode of the driving transistor DTFT, and a second electrode of the storage capacitor C1 is electrically connected with the second electrode of the driving transistor DTFT. A control electrode of the sensing transistor T2 is electrically connected with a sensing control line SL, a first electrode of the sensing transistor T2 is electrically connected with the second electrode of the driving transistor DTFT, and a second electrode of the sensing transistor T2 is electrically connected with a sensing signal line RL.

In some exemplary implementations, the input transistor T1 is configured to receive the data signal transmitted by the data signal line DL under the control of the scanning signal line GL, enabling the control electrode of the driving transistor DTFT to receive the data signal. The driving transistor DTFT is configured to generate a corresponding current at a second electrode under the control of the data signal received by the control electrode thereof. The sensing transistor T2 is configured to extract a threshold voltage Vth and a mobility of the driving transistor DTFT in response to compensation timing to compensate the threshold voltage Vth. The storage capacitor C1 is configured to store a potential of the control electrode of the driving transistor DTFT.

In some exemplary implementations, the input transistor T1, the driving transistor DTFT, and the sensing transistor T2 may be low temperature poly-silicon thin film transistors, or may be oxide thin film transistors, or may be low temperature poly-silicon thin film transistors and oxide thin film transistors. Low Temperature Poly-Silicon (LTPS for short) is used as an active layer of the low temperature poly-silicon thin film transistor, and an oxide is used as an active layer of the oxide thin film transistor. The low temperature poly-silicon thin film transistor has advantages such as high mobility and fast charging, and the oxide thin film transistor has the advantages such as low leakage current. In some exemplary implementations, the low temperature poly-silicon thin film transistors and the oxide thin film transistors may be integrated on one display substrate to form a Low Temperature Polycrystalline Oxide (LTPO for short) display substrate. The advantages of the low temperature poly-silicon thin film transistor and the oxide thin film transistor may be utilized, and high Pixel Per Inch (PPI for short) and low frequency driving may be achieved, so that power consumption can be reduced, and display quality can be improved. However, this embodiment is not limited thereto.

In some exemplary implementations, the light emitting element may be an Organic Light Emitting Diode (OLED for short), including a first electrode (anode), an organic light emitting layer, and a second electrode (cathode) that are stacked. However, this embodiment is not limited thereto.

Figure 5:
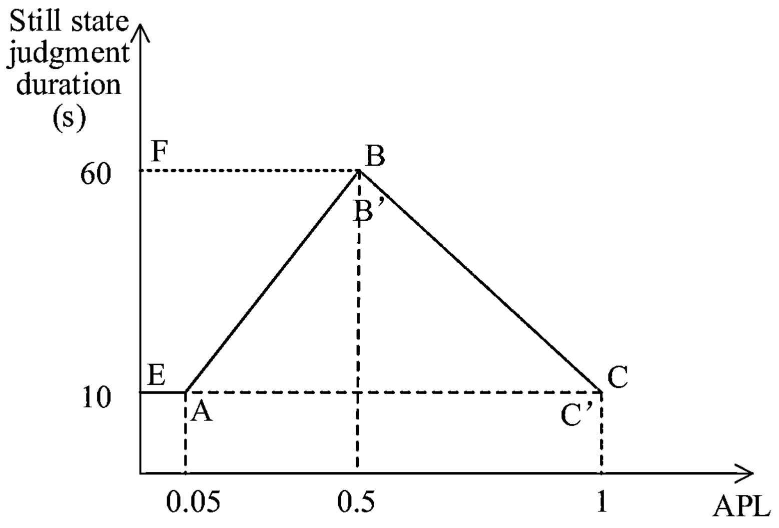
FIG. 5 is a graph of relationship between an average pixel level and a still image judgment duration according to at least one embodiment of the present disclosure.

FIG. 5 is a relationship graph between APL and still image judgment duration according to at least one embodiment of the present disclosure. In some exemplary implementations, as shown in FIG. 5, the relationship between the APL and the still image judgment duration of a full-screen still image may be shown as a curve FBC, in which a point F is an intersection of APL=0 and the still image judgment duration being a first value (e.g. 60), a point B is an intersection of the APL being a first threshold value (e.g. 0.5) and the still image judgment duration being the first value, and the point C is the intersection of the APL being 1 and the still image judgment duration being a second value (e.g. 10).

As shown in FIG. 5, when the APL of the full-screen still image is less than or equal to 0.5, the still image judgment duration may be about 60 s. For example, an APL of being less than or equal to 0.5 corresponds to a full-screen displayed image with low power consumption, and the still image judgment duration can be set to 60 s.

As shown in FIG. 5, when the APL of the full-screen still image is greater than 0.5 and less than or equal to 1, there is a linear relationship between the still image judgment duration and the APL, and the still image judgment duration decreases as the APL increases. As the APL increases from 0.5 to 1, the still image judgment duration decreases from 60 s to 10 s. For example, an APL being greater than 0.5 corresponds to a full-screen displayed image with high power consumption, and the still image judgment duration can be set to gradually decrease from 60 s. In some examples, when the APL of the full-screen still image is greater than 0.5 and less than or equal to 1, the APL and the still image judgment duration of the full-screen still image satisfy the following relationship: $y=-100x+110$, where x represents the APL and y represents the still image judgment duration.

In some exemplary implementations, as shown in FIG. 5, a relationship between APL and still image judgment duration of a window still image may be shown as a curve EAB'C'. A relationship between APL and still image judgment duration of a monochrome window still image may be shown as a curve EAB' and a relationship between APL and still image judgment duration of a mixed-color window still image may be shown as a curve B'C'. Among them, a point E is an intersection of APL=0 and the still image judgment duration being a second value (e.g. 10), a point A is an intersection of the APL being a second threshold value (e.g. 0.05) and the still image judgment duration being a third value, a point B' is an intersection of the APL being a third threshold value (e.g. 0.5) and the still image judgment duration being a fourth value (e.g. 60), and a point C' is an intersection of the APL being 1 and the still image judgment duration being a third value (e.g. 10). In this example, the first threshold value is equal to the third threshold value, the third value is equal to the second value, and the fourth value is equal to the first value. As shown in FIG. 5, the point B' coincides with the point B, and the point C' coincides with the point C. However, this embodiment is not limited thereto.

As shown in FIG. 5, when the APL of the window still image is less than or equal to 0.05, the still image judgment duration may be 10 s. For example, an APL being less than or equal to 0.05 corresponds to a monochrome still image with a window less than 10%. Assuming that the white display brightness is 800 nit in this case, the still image judgment duration can be set to 10 s. That is, when the display brightness is 800 nit and the display window is below 10%, the still image starts brightness attenuation after it lasts for 10 seconds. The EA section of the curve represents the displayed image with high brightness and small window. By setting a lower still image judgment duration, it is conducive to improving the case of short-term afterimage and reducing the power consumption.

As shown in FIG. 5, when the APL of the window still image increases from 0.05 to 0.5, the still image judgment duration may increase the APL increases. For example, an APL corresponds to a monochrome image with a window of 10% to 100%, assuming APL=0.5, the white display brightness is 200 nit in this case, and the still image judgment duration can be adjusted to 60 s. That is, a still image with a display brightness of 200 nit can start brightness attenuation after it lasts for 60 seconds. In this example, increasing APL from 0.05 to 0.5 corresponds to increasing monochrome window from 10% to 100%, so the still image judgment duration can be gradually increased to 60 s. In some examples, when the APL of the window still image is greater than 0.05 and less than or equal to 0.5, the APL and the still image judgment duration of the window still image substantially satisfy the following relationship: y=111x+4.44, where x represents the APL and y represents the still image judgment duration.

As shown in FIG. 5, when the APL of the window still image is increased from 0.5 to 1, the still image judgment duration may decrease as the APL increases. For example, APL=1 corresponds to a full-screen mixed-color displayed image with 255 gray scales, and the power consumption is high in this case. In order to reduce the power consumption with the full-screen displayed image, the still image judgment duration can be adjusted to 10 s, that is, the brightness attenuation of the still image starts after it lasts for 10 s. In some examples, when the APL of the window still image is greater than 0.5 and less than or equal to 1, the APL and the still image judgment duration of the window still image substantially satisfy the following relationship: y=−100x+110, where x represents the APL and y represents the still image judgment duration.

As can be seen from FIG. 5, when the APL of the full-screen still image is in [0, 0.5], y=60; and when the APL of the full-screen still image is in (0.5, 1], y=−100x+110.

When the APL of the monochrome window still image is in [0, 0.05], y=10; when the APL of the monochrome window still image is in (0.05, 0.5], y=111x+4.44; and when the APL of the mixed-color window still image is in (0.5, 1], y=−100x+110.

Among them, x represents the APL of the still image, and y represents the still image judgment duration.

Figure 6:
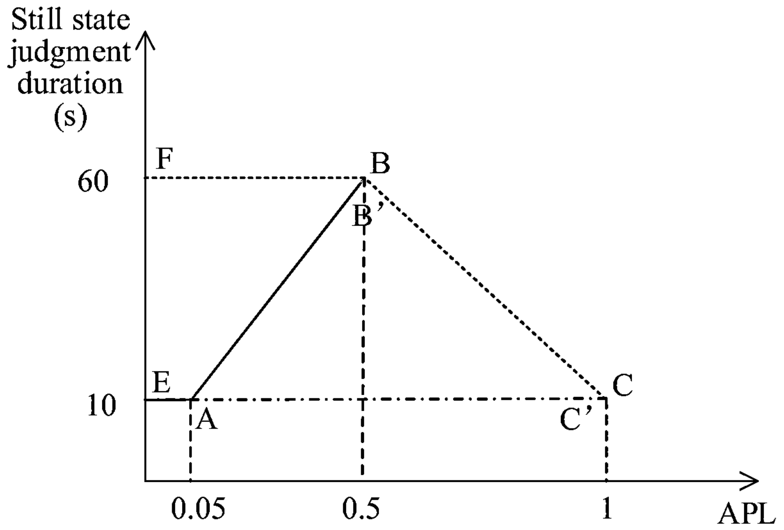
FIG. 6 is another graph of relationship between an average pixel level and a still image judgment duration of at least one embodiment of the present disclosure.

FIG. 6 is another relationship graph between APL and still image judgment duration according to at least one embodiment of the present disclosure. In some exemplary implementations, as shown in FIG. 6, the relationship between the APL and the still image judgment duration of a full-screen still image is shown as a curve FBC. The description of the curve FBC may refer to the embodiment shown in FIG. 5 and is therefore not repeated here.

In some exemplary implementations, as shown in FIG. 6, a relationship between APL and still image judgment duration of a monochrome window still image may be shown as a curve EAB', and a relationship between APL and still image judgment duration of a mixed-color window still image may be shown as a curve B'C'. In this example, a point B coincides with a point B', and a point C coincides with a point C'. However, this embodiment is not limited thereto.

As can be seen from FIG. 6, when the APL of the full-screen still image is in [0, 0.5], y=60; and when the APL of the full-screen still image is in (0.5, 1], y=−100x+110.

When the APL of the monochrome window still image is in [0, 0.05], y=10; when the APL of the monochrome window still image is in (0.05, 0.5], y=111x+4.44; and when the APL of the monochrome window still image is in [0, 1], y=10.

Among them, x represents the APL of the still image, and y represents the still image judgment duration.

In this exemplary embodiment, for a still image of a monochrome window with high brightness and a still image of a mixed-color window, a smaller still image judgment duration can be adjusted and employed, thereby preventing a short-term afterimage from being generated due to a local high-power consumption image.

Figure 7:
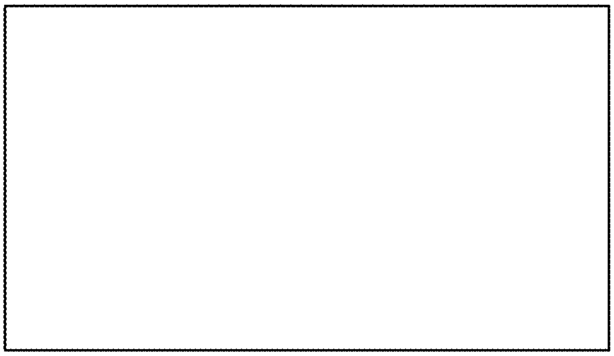
FIG. 7 is an example diagram of a full-screen still image according to at least one embodiment of the present disclosure.
Figure 8:
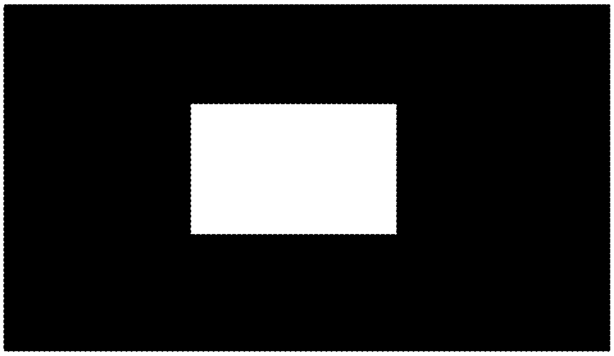
FIG. 8 is an example diagram of a monochrome window still image according to at least one embodiment of the present disclosure.
Figure 9:
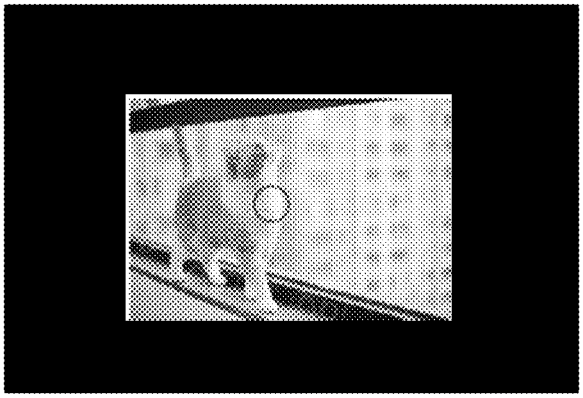
FIG. 9 is an example diagram of a mixed-color window still image according at least one embodiment of the present disclosure.

FIG. 7 is an example diagram of a full-screen still image according to at least one embodiment of the present disclosure. FIG. 8 is an example diagram of a monochrome window still image according to at least one embodiment of the present disclosure. FIG. 9 is an example diagram of a mixed-color window still image according at least one embodiment of the present disclosure. FIG. 7 shows a white still image with a 100% window and 255 gray scales, and an APL of the full-screen still image shown in FIG. 7 is about 0.5. FIG. 8 shows a white still image with a 25% window and 255 gray scales, and an APL of the monochrome window still image shown in FIG. 8 is about 0.125. FIG. 9 shows a mixed-color still image with a 50% window. The image shown in FIG. 9 is illustrated by an example of a gray scale image, and the window image shown in FIG. 9 is a color picture in some examples.

In this exemplary embodiment, the still image judgment duration can be flexibly adjusted for different still images, so as to effectively solve the short-term afterimage caused by high-brightness still images, and achieve the purpose of reducing power consumption, thereby improving display quality of a display product, satisfying the requirements of customers and making the display product more competitive.

Figure 10:
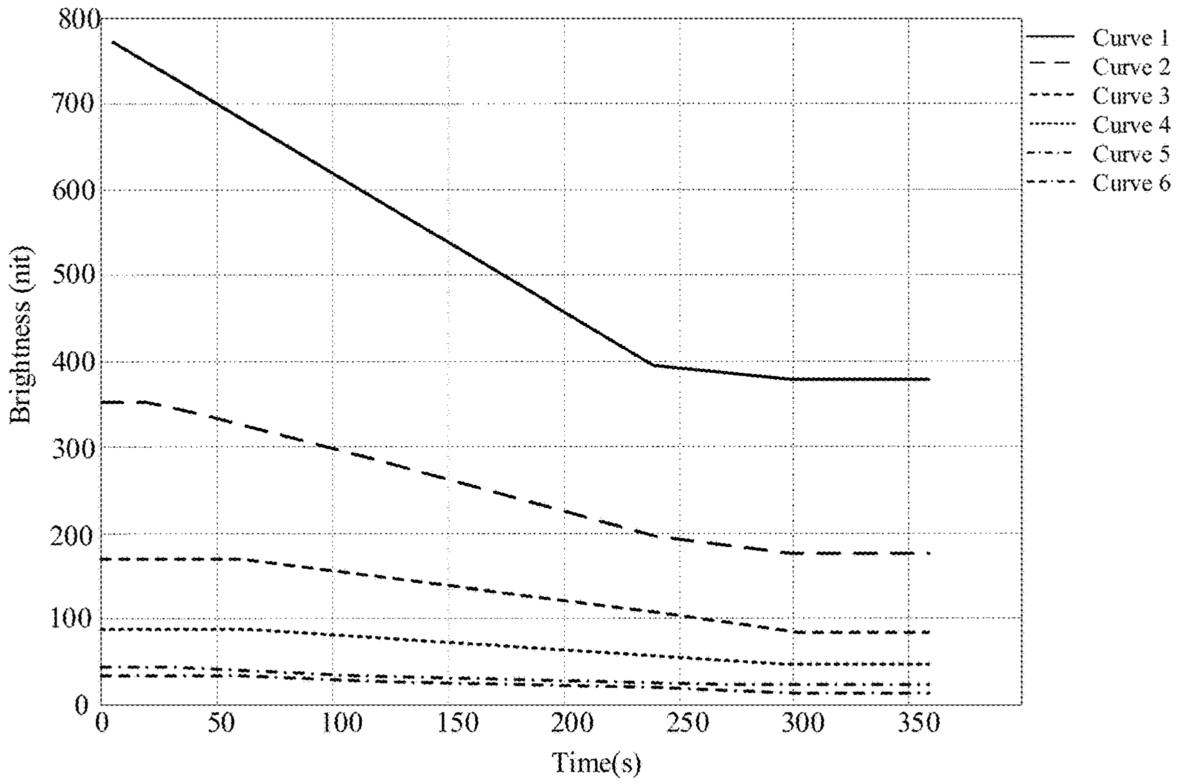
FIG. 10 is a brightness attenuation graph of different still images according to at least one embodiment of the present disclosure.

FIG. 10 is a brightness attenuation graph of different still images according to at least one embodiment of the present disclosure. FIG. 10 is a schematic diagram showing a measurement result of a still image of a display product in which the control device of this embodiment is applied. Brightness data corresponding to FIG. 10 may be shown in Table 1.

TABLE 1

| Time(seconds) | Curve 1 | Curve 2 | Curve 3 | Curve 4 | Curve 5 | Curve 6 |
|---|---|---|---|---|---|---|
| 1 | 764.8 | 351.5 | 171.7 | 88.18 | 45.48 | 30.39 |
| 5 | 769.9 | 350.9 | 171.7 | 88.2 | 45.36 | 30.4 |
| 10 | 761.5 | 350.8 | 171.6 | 88.19 | 45.25 | 30.41 |
| 20 | 745.2 | 350.9 | 171.5 | 88.15 | 44.37 | 30.38 |
| 40 | 711.6 | 342.3 | 171.3 | 88.12 | 42.53 | 30.37 |
| 60 | 681.3 | 327.6 | 171.3 | 88.16 | 40.31 | 30.39 |
| 120 | 586.2 | 283.4 | 150.1 | 77.2 | 34.02 | 26.7 |
| 180 | 491.2 | 239.5 | 129.7 | 66.3 | 28.69 | 22.9 |
| 240 | 396.2 | 196.1 | 108.1 | 55.26 | 23.41 | 19.1 |
| 300 | 380.3 | 176.2 | 86.5 | 44.2 | 22.3 | 15.2 |
| 360 | 380.6 | 176.3 | 86.4 | 44.1 | 22.31 | 15.3 |

In FIG. 10 and Table 1, Curve 1 represents a brightness attenuation curve of a white still image with 10% window and 255 gray scales. Curve 2 represents a brightness attenuation curve of a white still image with 50% window and 255 gray scales. Curve 3 represents a brightness attenuation curve of a white still image with full-screen display and 255 gray scales. Curve 4 represents a brightness attenuation curve of a white still image with full-screen display and 127 gray scales. Curve 5 represents a brightness attenuation curve of a red and green mixed-color still image with full-screen display and 255 gray scales. Curve 6 represents a brightness attenuation curve of a red still image with full-screen display and 255 gray scales.

In some exemplary implementations, after determining the current displayed image as a still image, the processor of the control device can obtain a full-screen brightness sum by accumulating brightness of all pixels in a display region, and then calculate the APL of the still image by using the full-screen brightness sum, for example, the APL is a ratio of the full-screen brightness sum to a constant, and the APL ranges from 0 to 1. Furthermore, it is possible to determine whether the still image is a full-screen image and whether it is a monochrome image according to display color(s) and the number of sub-pixels with non-zero gray scale in the still image. Then, according to the type of still image and the APL, the corresponding still image judgment duration can be found from a time comparison table. Subsequently, it can be judged whether to perform brightness attenuation on the still image by using the still image judgment duration.

As can be seen from FIG. 10 and Table 1, the still image corresponding to Curve 1 starts brightness attenuation after about 10 s, the still image corresponding to Curve 2 starts brightness attenuation after about 20 s, the still images corresponding to Curves 3 to 5 start brightness attenuation after about 60 s, and the still image corresponding to Curve 6 starts brightness attenuation after about 10 s. It may be seen that, different types of still images have different still image judgment duration. Therefore, there are differences in starting time points of brightness attenuation, which is conducive to shortening overall time of brightness attenuation of still images, thereby effectively avoiding the case of short-term afterimage caused by high-brightness still images, reducing power consumption and improving display effects of a display product.

Figure 11:
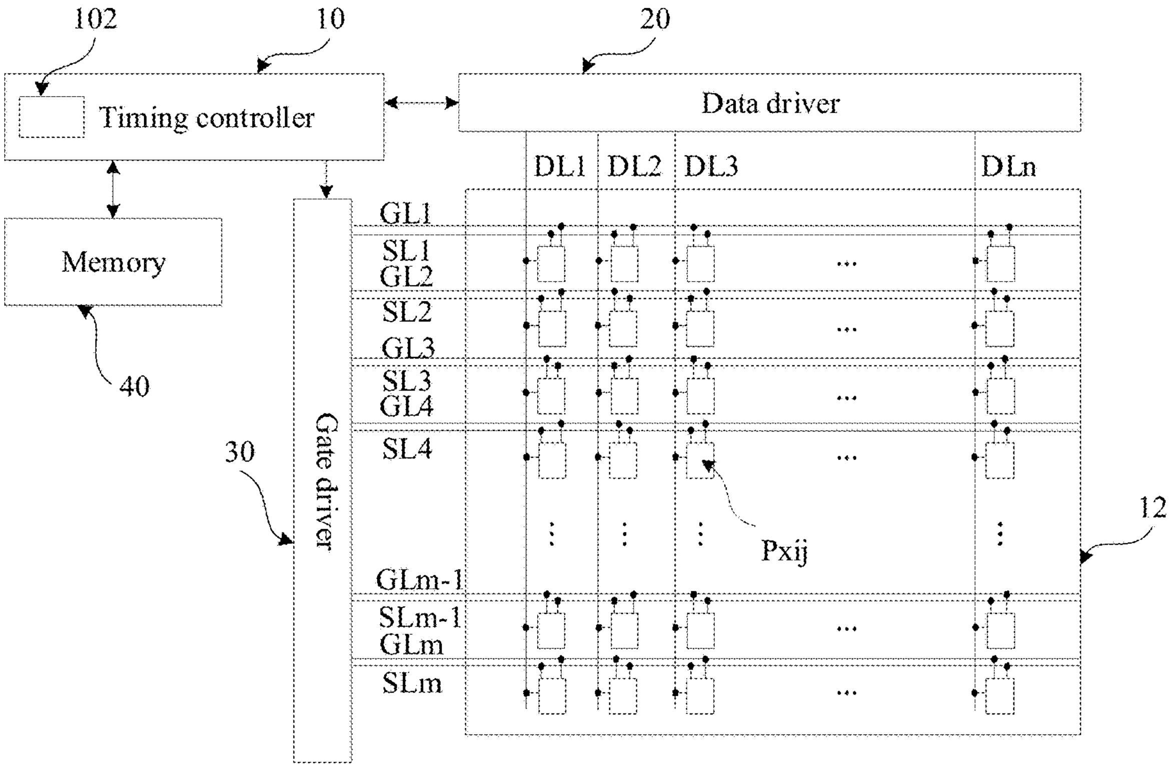
FIG. 11 is another schematic diagram of a display device according to at least one embodiment of the present disclosure.

FIG. 11 is another schematic diagram of a display device according to at least one embodiment of the present disclosure. As shown in FIG. 11, the display device of this exemplary embodiment includes: a pixel array 12 and a panel driver. The panel driver is configured to drive the pixel array 12. The panel driver may include: a timing controller 10, a data driver 20, a gate driver 30, and a memory 40. A processor 102 of the control device provided in this embodiment may be integrated in the timing controller 10, and the memory 40 may be provided independently of the timing controller 10. However, this embodiment is not limited thereto. For other structures of the display device of this embodiment, reference may be made to the description of the aforementioned embodiments, so it will not be repeated here.

Figure 12:
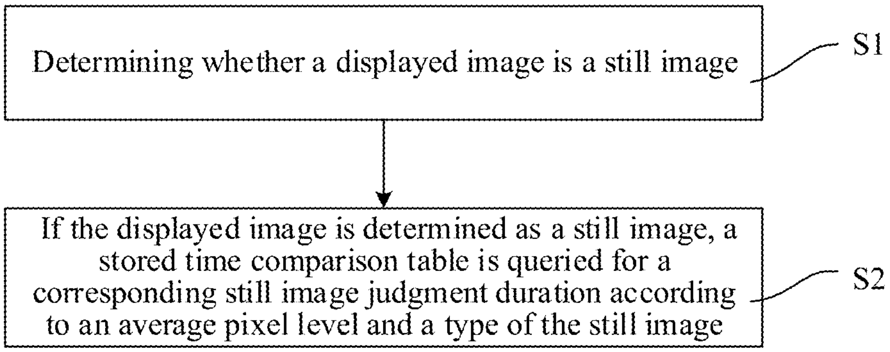
FIG. 12 is a flowchart of a method for driving a control device according to at least one embodiment of the present disclosure.

FIG. 12 is a flowchart of a method for driving a control device provided in at least one embodiment of the present disclosure. As shown in FIG. 12, the method for driving the control device of this embodiment includes the following steps:

S1, determining whether a displayed image is a still image;

S2, when the displayed image is determined as a still image, querying a stored time comparison table for a corresponding still image judgment duration according to an average pixel level and a type of the still image.

In some exemplary implementations, the method described above may further include: determining whether the still image remains still within the still image judgment duration; and when duration for which the still image remains still is determined to reach the still image judgment duration, performing brightness attenuation on the still image until the still image no longer remains still. For relevant description of the method for driving the control device of this embodiment, reference may be made to the description of the control device of the above-mentioned embodiments, and thus will not be repeated here.

In some exemplary implementations, the processor of the control device may include a processing device of a Microcontroller Unit (MCU), or a Field-Programmable Gate Array (FPGA), or the like. The memory of the control device may store a time comparison table, as well as software programs and modules of application software, such as program instructions or modules corresponding to the method in this embodiment. The processor performs various function applications and data processing by operating software programs and modules stored in the memory, for example implements the method provided in this embodiment. The memory may include a high-speed random access memory, and may also include a non-volatile memory such as one or more magnetic storage devices, flash memories, or other non-volatile solid-state memories. In some examples, the memory may include memories remotely provided with respect to the processor, and these remote memories may be connected with the control device through a network. Examples of the above network include, but are not limited to, the Internet, an intranet, a local area network, a mobile communication network, and combinations thereof.

In addition, at least one embodiment of the present disclosure further provides a non-transitory computer-readable storage medium storing a computer program, wherein when the computer program is executed, and the steps of the above-mentioned method are implemented.

Those of ordinary skills in the art may understand that all or some of the steps in the method, functional modules or units in the system and device disclosed above may be implemented as software, firmware, hardware, and an appropriate combination thereof. In a hardware implementation, a division between functional modules or units mentioned in the above description does not necessarily correspond to a division of physical components. For example, a physical component may have multiple functions, or a function or a step may be performed by several physical components in cooperation. Some or all components may be implemented as software executed by a processor such as a digital signal processor or a microprocessor, or implemented as hardware, or implemented as integrated circuits such as application specific integrated circuits. Such software may be distributed in a computer-readable medium, which may include a computer storage medium (or a non-transitory medium) and a communication medium (or a transitory medium). As known to those of ordinary skills in the art, the term "computer storage medium" includes volatile and non-volatile and removable and irremovable media implemented in any method or technology for storing information (such as computer-readable instructions, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, as known to those of ordinary skills in the art, the communication medium usually contains computer-readable instructions, a data structure, a program module, or other data in a modulated data signal, such as a carrier or other transmission mechanisms, and may include any information delivery medium.

The above shows and describes basic principles, main features, and advantages of the present disclosure. The present disclosure is not limited by the above embodiments. The above embodiments and descriptions in the specification only illustrate the principles of the present disclosure. Without departing from the spirit and scope of the present disclosure, there will be many changes and improvements in the present disclosure, and all of these changes and improvements fall within the protection scope of the present disclosure.

The invention claimed is:

1. A control device, comprising:

a memory configured to store a time comparison table;

a processor configured to determine whether a displayed image is a still image, and query the time comparison table for a corresponding still image judgment duration according to an average pixel level and a type of the still image when the displayed image is determined as the still image, wherein the time comparison table stores a mapping relationship between an average pixel level and a still image judgment duration of a full-screen still image, and a mapping relationship between an average pixel level and a still image judgment duration of a window still image, wherein the mapping relationship between the average pixel level and the still image judgment duration of the full-screen still image comprises:

if the average pixel level of the full-screen still image is less than or equal to a first threshold value, the still image judgment duration is a first value; and if the average pixel level of the full-screen still image is greater than the first threshold value, the still image judgment duration is smaller than the first value and greater than or equal to a second value, wherein the still image judgment duration decreases as the average pixel level of the full-screen still image increases.

2. The control device according to claim 1, wherein, the processor is further configured to determine whether the still image remains still within the still image judgment duration, and perform brightness attenuation on the still image until the still image no longer remains still when it is determined that duration for which the still image remains still has reached the still image judgment duration.

3. The control device according to claim 1, wherein the type of the still image is one of the following: a full-screen image, a monochrome window screen, and a mixed-color window screen.

4. The control device according to claim 1, wherein the first threshold value has a range of 0.4 to 0.6.

5. The control device according to claim 1, wherein the mapping relationship between the average pixel level and the still image judgment duration of the window still image comprises:

if the window still image is a monochrome window displayed image and the average pixel level of the window still image is less than or equal to the second threshold value, the still image judgment duration is a third value;

if the window still image is a monochrome window displayed image, and the average pixel level of the window still image is greater than the second threshold value and less than or equal to a third threshold value, the still image judgment duration is greater than the third value and less than or equal to a fourth value, and the still image judgment duration increases as the average pixel level of the window still image increases;

if the window still image is a mixed-color window displayed image, and the average pixel level of the window still image is greater than the third threshold value, the still image judgment duration is greater than the third value and less than or equal to the fourth value, and the still image judgment duration decreases as the average pixel level of the window still image increases.

6. The control device according to claim 5, wherein the second threshold value has a range of less than or equal to 0.05, and the third threshold value has a range of 0.4 to 0.6.

7. The control device according to claim 1, wherein the mapping relationship between the average pixel level and the still image judgment duration of the window still image comprises:

if the window still image is a monochrome window displayed image and the average pixel level of the window still image is less than or equal to a fourth threshold value, the still image judgment duration is a fifth value;

if the window still image is a monochrome window displayed image, and the average pixel level of the window still image is greater than the fourth threshold value and less than or equal to a fifth threshold value, the still image judgment duration is greater than the fifth value and less than or equal to a sixth value, and the still image judgment duration increases as the average pixel level of the window still image increases; and if the window still image is a mixed-color window displayed image, the still image judgment duration is a seventh value, wherein the seventh value is less than the sixth value.

8. The control device according to claim 7, wherein the fourth threshold value has a range of less than or equal to 0.05, and the fifth threshold value has a range of 0.4 to 0.6.

9. The control device according to claim 1, wherein the time comparison table stores following mapping relationships:

when the average pixel level of the full-screen still image is in [0, 0.5], y=60;

when the average pixel level of the full-screen still image is in (0.5, 1], y=−100x+110;

when an average pixel level of a monochrome window still image is in [0, 0.05], y=10;

when the average pixel level of the monochrome window still image is in (0.05, 0.5], y=111x+4.44; and when the average pixel level of the mixed-color window still image is in (0.5, 1], y=−100x+110;

where x represents the average pixel level of the still image, and y represents the still image judgment duration.

10. The control device according to claim 1, wherein the time comparison table stores following mapping relationships:

when the average pixel level of the full-screen still image is in [0, 0.5], y=60;

when the average pixel level of the full-screen still image is in (0.5, 1], y=−100x+110;

when an average pixel level of a monochrome window still image is in [0, 0.05], y=10;

when the average pixel level of the monochrome window still image is in (0.05, 0.5], y=111x+4.44; and when an average pixel level of a mixed-color window still image is in [0, 1], y=10;

where x represents the average pixel level of the still image, and y represents the still image judgment duration.

11. A display device, comprising the control device according to claim 1.

12. The display device according to claim 11, wherein the control device is integrated in a timing controller; or, a processor of the control device is integrated in the timing controller, and a memory of the control device is disposed independently of the timing controller.

13. The display device according to claim 12, further comprising: a data driver configured to generate a data signal to be provided to a data signal line using a gray scale value and a control signal which are received from the timing controller.

14. The display device according to claim 12, further comprising: a gate driver configured to generate a scanning signal to be provided to a scanning signal line and a sensing control signal to be provided to a sensing control line by using a clock signal and a starting signal which are received from the timing controller.

15. The display device according to claim 12, further comprising: a pixel array comprising a plurality of sub-pixels, wherein at least one of the sub-pixels comprises a pixel circuit and a light emitting element;

the pixel circuit comprises an input transistor, a driving transistor, a sensing transistor and a storage capacitor;

a control electrode of the input transistor is electrically connected with a scanning signal line, a first electrode of the input transistor is electrically connected with a data signal line, and a second electrode of the input transistor is electrically connected with a control electrode of the driving transistor;

a first electrode of the driving transistor is electrically connected with a first power supply line, and a second electrode of the driving transistor is electrically connected with a first electrode of the light emitting element;

a control electrode of the sensing transistor is electrically connected with a sensing control line, a first electrode of the sensing transistor is electrically connected with the second electrode of the driving transistor, and a second electrode of the sensing transistor is electrically connected with a sensing signal line;

a first electrode of the storage capacitor is electrically connected with the control electrode of the driving transistor, and a second electrode of the storage capacitor is electrically connected with the second electrode of the driving transistor; and a second electrode of the light emitting element is connected with a second power supply line.

16. A method for driving a control device, comprising:

determining whether a displayed image is a still image;

querying a stored time comparison table for a corresponding still image judgment duration according to an average pixel level and a type of the still image when the displayed image is determined as the still image, wherein the time comparison table stores a mapping relationship between an average pixel level and a still image judgment duration of a full-screen still image, and a mapping relationship between an average pixel level and a still image judgment duration of a window still image, wherein the mapping relationship between the average pixel level and the still image judgment duration of the full-screen still image comprises:

if the average pixel level of the full-screen still image is less than or equal to a first threshold value, the still image judgment duration is a first value; and if the average pixel level of the full-screen still image is greater than the first threshold value, the still image judgment duration is smaller than the first value and greater than or equal to a second value, wherein the still image judgment duration decreases as the average pixel level of the full-screen still image increases.

17. The method according to claim 16, further comprising:

determining whether the still image remains still within the still image judgment duration;

performing brightness attenuation on the still image until the still image no longer remains still when it is determined that duration for which the still image remains still has reached the still image judgment duration.

18. A non-transitory computer-readable storage medium, storing a computer program, wherein when the computer program is executed, the method according to claim 16 is implemented.

* * * * *